Aug. 27, 1929.  H. C. GUSTAFSON  1,726,295
TOOL HOLDING CHUCK
Filed Oct. 24, 1927  2 Sheets-Sheet 1
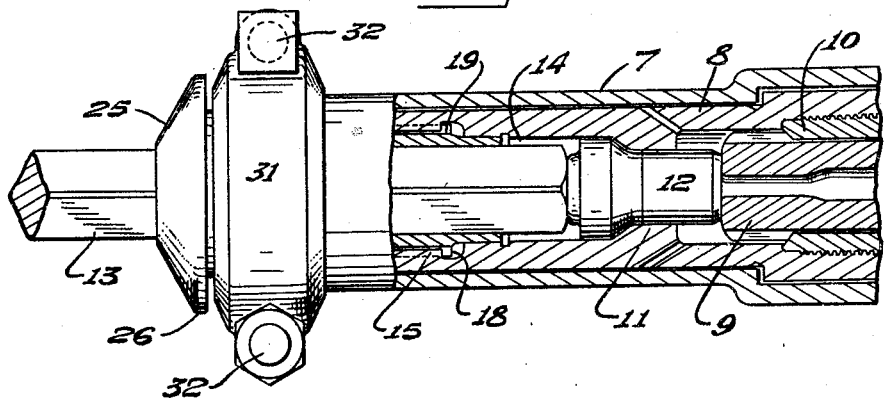
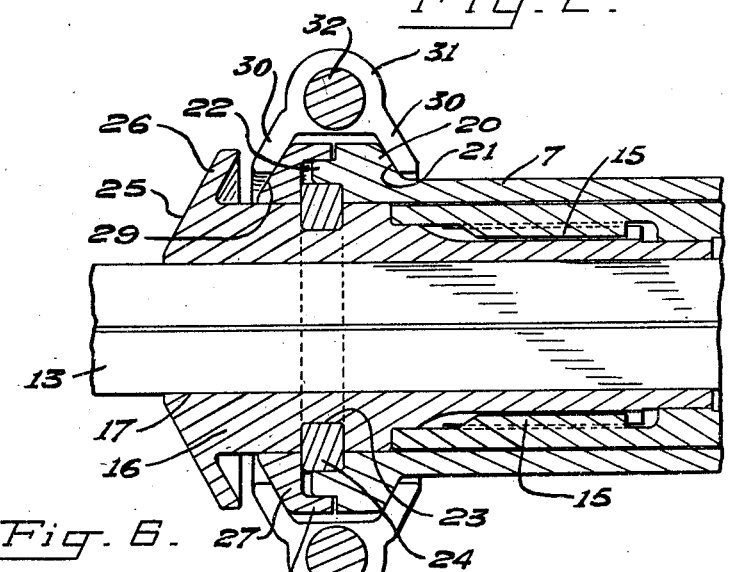
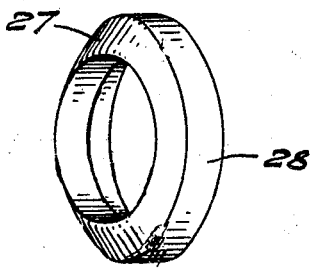
Inventor
Hjalmer C. Gustafson
By
Attorney Aug. 27, 1929. H. C. GUSTAFSON 1,726,295
TOOL HOLDING CHUCK
Filed Oct. 24, 1927 2 Sheets-Sheet 2

Inventor,
Hjalmar C. Gustafson
By
Attorney

Patented Aug. 27, 1929.

1,726,295

UNITED STATES PATENT OFFICE.

HJALMER C. GUSTAFSON, OF DENVER, COLORADO, ASSIGNOR TO GARDNER-DENVER COMPANY, OF DENVER, COLORADO, A CORPORATION OF DELAWARE.

TOOL-HOLDING CHUCK.

Application filed October 24, 1927. Serial No. 228,371.

The present invention relates to chuck structures for rock drills and similar tools, the object being to provide a chuck assembly, which will permit a worn chuck to be removed and replaced by a new one without dismantling the drill, the mechanism being such that it is readily operable to permit the release of the chuck, and yet will effectively hold the chuck in its operative position.

Figure 3:
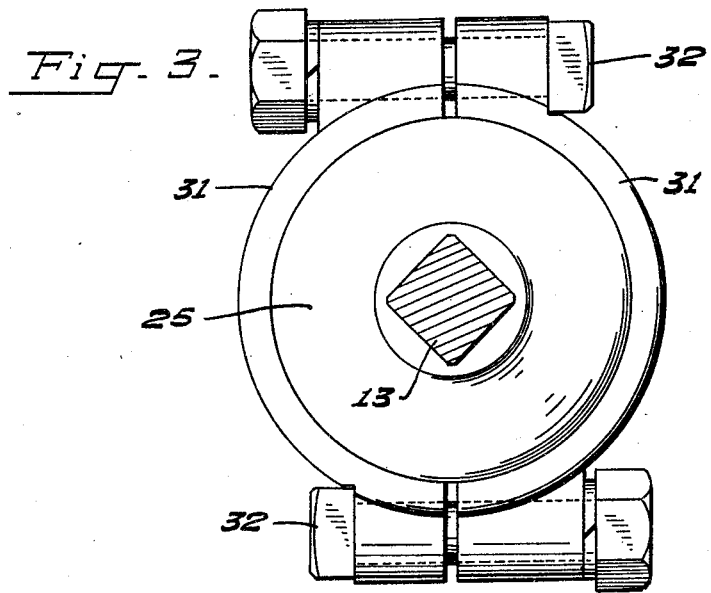
Figure 4:
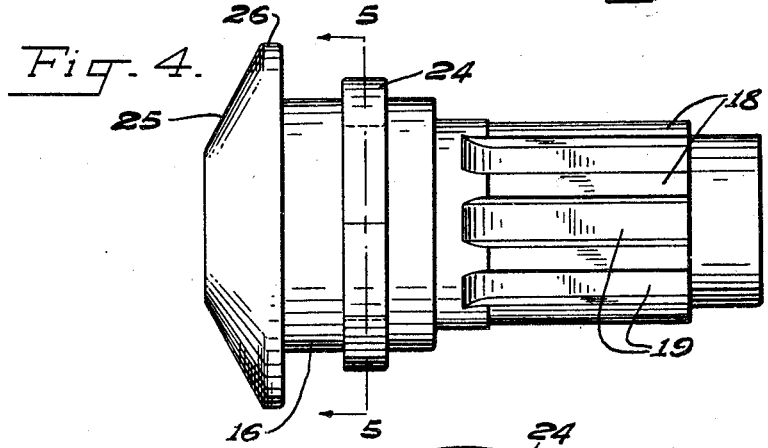
Figure 5:
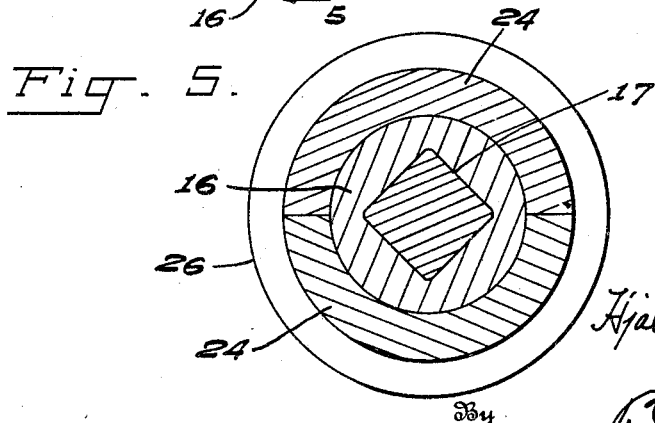

In the accompanying drawings:

Figure 1 is a view partly in longitudinal section, and partly in elevation of the chuck end of a rock drill, in which the invention is embodied, Figure 2 is an enlarged longitudinal sectional view of the front end portion, Figure 3 is a front elevation, Figure 4 is a side elevation of the chuck, Figure 5 is a cross sectional view on the line 5—5 of Figure 4, Figure 6 is a detail perspective view of the retaining collar.

In the embodiment disclosed, the chuck housing that is mounted on the front end of the drill, is shown at 7, and located therein is a rotatable chuck sleeve 8, with which the piston 9 has the usual sliding interfitting engagement 10, by which the sleeve is caused to rotate with the piston. In the present embodiment this sleeve is provided with a bearing portion 11 for a tappet 12 that is struck by the piston and transmits the blow to the drill steel, a portion of which is shown at 13.

The front end of the sleeve 8 is provided with an enlarged chamber 14, in which are located longitudinally disposed keys 15. The chuck is shown at 16, and is provided with an angular socket 17 that receives the steel 13. This chuck is provided with external longitudinally disposed keys 18, forming between them keyways 19 that receive the keys 15 of the chuck sleeve 8, the rear end portion of the chuck being small enough to enter the chamber 14 of said chuck sleeve.

The front end of the chuck housing 7 has an outstanding annular flange 20 with an outwardly and forwardly inclined rear face 21, and said housing furthermore has a forwardly extending annular rib or flange 22. The chuck 16 is provided with an annular groove 23 that receives an abutment ring 24, which as shown in Figure 5, is preferably made of sections. The ring projects beyond the face of the chuck body and is adapted to fit within the rib or flange 22 of the chuck housing 7, as shown in Figure 2. The front end of the chuck 16 is beveled, as shown at 25 and terminates in an annular dirt shield flange 26. Between this flange 26 and the abutment ring 24 is located a retaining collar 27 surrounding the chuck body and having a rearwardly extending peripheral flange 28 that engages over the rib or flange 22 of the housing 7. The front face of the retaining collar 27 is rearwardly beveled, as shown at 29. As a consequence, it will be evident that the flange 20 of the chuck housing and the retaining ring 27 constitute an outwardly tapered rib. This rib is embraced by the divergent flanges 30 of a clamping or holding ring 31 surrounding the retaining collar 27 and the housing flange 20, and being preferably made of sections connected by bolts 32 that serve to contract said sections on the flange 20 and the retaining collar, so as to insure an effective holding action.

With this structure, it will be evident that the chuck is effectively held in its operative interlocking engagement with the chuck sleeve and will rotate therewith, thereby turning the drill steel. When the chuck becomes worn, it is only necessary to remove the ring 31, whereupon the chuck can be slipped outwardly from the housing and disengaged from the chuck sleeve. A new chuck can be placed in position, and the parts reassembled.

From the foregoing, it is thought that the construction, operation and many advantages of the hereindescribed invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In a tool chuck, the combination with a chuck housing, of a chuck member therein, comprising an inner section and an outer section having detachable interlocking engagement, a retaining collar engaged with the outer section and located in advance of the housing, and a securing ring embracing the housing and retaining ring for holding the latter against separation from the former.

2. In a tool chuck, the combination with a chuck housing having an outstanding flange at its front end, of a chuck member therein comprising an inner section and an outer section having detachable interlocking engagement, a retaining collar engaged with the outer section and located against the front end of the chuck housing, and a securing ring surrounding the flange of the housing and the ring and having an internal groove that receives the same and prevents their separation.

3. In a tool chuck, the combination with a chuck housing having an outstanding flange at its front end, of a chuck member therein comprising an inner section and an outer section having detachable interlocking engagement, a retaining collar engaged with the outer section and located against the front end of the chuck housing, a sectional securing ring surrounding the flange of the housing and the ring and having an internal groove that receives the same and prevents their separation, and means for securing the sections of the ring together.

4. In a tool chuck, the combination with a chuck housing, of a chuck sleeve therein, a chuck having a detachable interlocking engagement with the chuck sleeve and provided with a groove, an abutment ring in the groove, a retaining ring surrounding the chuck on the outer side of the abutment ring, and means for securing the retaining ring to the chuck housing.

5. In a tool chuck, the combination with a chuck housing, of a chuck sleeve therein, a chuck having a detachable interfitting engagement with the outer end portion of the chuck sleeve, said chuck projecting beyond the housing and having a shield flange on its outer end and an annular groove at the inner side of the shield flange, a removable abutment ring in the groove, a retaining collar surrounding the chuck between the shield flange and abutment ring and having a bearing against the end of the chuck housing, said end having an outstanding annular flange, and a sectional securing ring surrounding the flange and retaining collar and having an internal outwardly tapered groove that receives the flange and peripheral portion of the retaining collar.

6. In a tool chuck, the combination with a chuck housing having an outstanding annular flange on its front end, of a chuck sleeve in the housing, a chuck detachably interfitted with the sleeve and having an outstanding flange in front of the housing, a retaining ring surrounding the chuck in advance of the chuck flange, and a securing ring surrounding the housing flange and retaining ring and bridging the joint between them, said securing ring having an internal groove that receives the peripheral portions of said housing flange and retaining ring.

7. In a tool chuck, the combination with a chuck housing having an outstanding annular flange on its front end, of a chuck sleeve in the housing, a chuck detachably interfitted with the sleeve and having an outstanding flange in front of the housing, a retaining ring surrounding the chuck in advance of the chuck flange, said retaining ring and housing flange having their outer surfaces inclined towards each other, and a securing ring surrounding the housing flange and retaining ring and bridging the joint between them, said securing ring having an internal transversely tapered groove that receives the peripheral portions of said housing flange and retaining ring.

8. In a tool chuck, the combination with a chuck housing, of a chuck sleeve therein, of a chuck detachably interlocked with the chuck sleeve and removable through the front of the housing, said chuck having an outstanding shield flange at its outer end and an annular groove behind the shield flange, a retaining collar surrounding the chuck between the shield flange and groove and removable from the rear end of the chuck, a sectional abutment ring detachably engaged in the groove and interposed between the retaining collar and housing, and means for securing the retaining ring to the housing.

In testimony whereof, I affix my signature.

HJALMER C. GUSTAFSON.